United States Patent [19]
Ruchser et al.

[11] 3,870,073
[45] Mar. 11, 1975

[54] VALVE ASSEMBLY FOR CONTROLLING FLUID PRESSURE OPERATED APPARATUS PARTICULARLY PRESSES

[75] Inventors: Erich Ruchser, Stetten/Wurtt; Helmut Ott, Fellbach, both of Germany

[73] Assignee: Technomatic A.G., Aesch, Luzern, Switzerland

[22] Filed: Nov. 16, 1973

[21] Appl. No.: 416,437

[30] Foreign Application Priority Data
Feb. 14, 1973 Switzerland.......................... 2224/73

[52] U.S. Cl.............................. 137/596.16, 91/424
[51] Int. Cl............................................. F16k 11/20
[58] Field of Search .... 91/424; 137/596.15, 596.16, 137/596.17, 552, 554, 599

[56] References Cited
UNITED STATES PATENTS
3,139,109  6/1964  Ruchser........................ 137/596.16
3,699,993  10/1972  Herion et al...................... 91/424 X

*Primary Examiner*—Robert G. Nilson
*Attorney, Agent, or Firm*—Robert E. Burns; Emmanuel J. Lobato; Bruce L. Adams

[57] ABSTRACT

A valve assembly for controlling fluid pressure operated apparatus in particular presses comprises two parallel connected valves with axially aligned valve members in the form of pistons axially movable in axially aligned cylinders. Movement of the valve members is controlled by pilot valves supplying pressure fluid selectively to chambers at the rear ends of the cylinders and to annular chambers surrounding the pistons. Axially aligned pins are slidable in aligned bores in the valve pistons and are biased toward one another by springs. In the event the pins are asymmetrically displaced by reason of malfunctioning of the valves, an electric switch means is operated to sound an alarm, shut off the fluid pressure or provide other desired function.

10 Claims, 4 Drawing Figures

3,870,073

VALVE ASSEMBLY FOR CONTROLLING FLUID PRESSURE OPERATED APPARATUS PARTICULARLY PRESSES

FIELD OF INVENTION

The present invention relates to safety valves and in particular a valve assembly for controlling fluid operated apparatus, for example presses.

BACKGROUND OF INVENTION

Valves for controlling presses are known in which two working pistons are arranged on an axis and are movable toward and from one another. These valves are provided with safety devices comprising a double piston in a cylinder which is connected with the passages leading from pilot valves to the control valves and with spaces on the load circuit side of the working pistons. In this manner the safety device is tripped when one of the pilot valves fails or when one of the working pistons is blocked in the off or on position.

An objection of this arrangement is that the valve housing must be provided with a large number of control channels for the safety device and room for the safety device itself. In all of these channels disturbances can occur under certain circumstances during operation which impair the operability of the safety device so that just when faulty operation occurs in the control valve or pilot valve, the safety device is not in condition to respond to the faulty operation and switch off the press. The same is true when a breakdown in the safety device itself occurs and the device thereby becomes inoperative. For example, this can occur when the piston of the safety device locks.

SUMMARY OF INVENTION

An object of the invention is to provide a safety valve for controlling fluid pressure apparatus, and in particular presses, which overcomes the disadvantages of valves heretofore available and assures a certain and dependable switching off of the load circuit in the event of a disturbance.

In accordance with the invention the valve assembly comprises two parallel connected valves with axially aligned working pistons. Each of the pistons is provided with an axial bore in which a control pin is slidable axially relative to the working piston. In the event of faulty operation or a disturbance, an electric switch is actuated by one or another of the control pins so as to sound an alarm, shut off the press or other apparatus or perform other desired function.

Preferably the two control pins are aligned axially with one another and their adjacent ends project beyond the forward ends of the working piston when in rest position. When the pistons move toward one another the control pins engage each other before the working pistons reach their "on" position. Advantageously, the control bolts are spring biased toward one another relative to the working pistons.

It is particularly advantageous that the axial bores in which the control pins are slidable extend to the rear ends of the working pistons so that in the "on" position of the working pistons the rear ends of the control pins extend beyond the rear ends of the pistons into the chambers at the rear ends of the working cylinders. In the housing there is preferably also a slidable tripping pin which is actuatable by the control pins and through which the electric switch is operable to switch off the entire fluid pressure circuit in the event of malfunctioning of the valve.

BRIEF DESCRIPTION OF DRAWINGS

The nature, objects and advantages of the invention will be more fully understood from the following description of a preferred embodiment shown by way of example in the drawings in which.

DESCRIPTION OF PREFERRED EMBODIMENT

Figure 2:
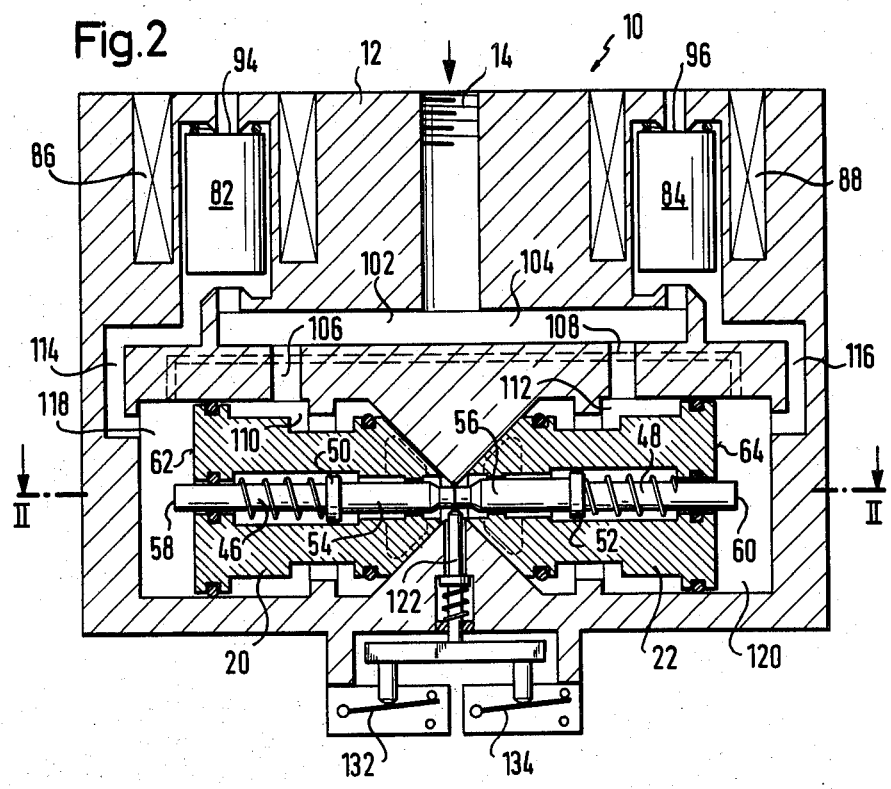
FIG. 2 shows the valve of FIG. 1 in on position.
Figure 2A:
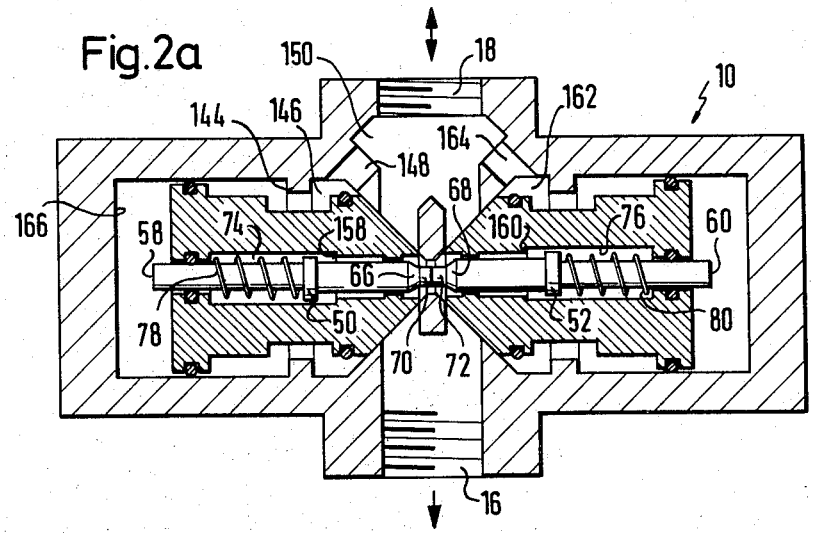
FIG. 2a is a longitudinal section of the line II—II in FIG. 2.

As illustrated in the drawings, the valve assembly 10 comprises a housing 12 of suitable material for example a suitable metal and is provided with an inlet 14, a return connection 16 and a work circuit connection 18. Two axially aligned work pistons 20 and 22 are movable toward and away from one another in cylinders 24 and 26 formed in the housing 12. The adjacent forward ends of the cylinders 24 and 26 are conical to form valve seats 154 and 156 which open into one another through a connecting bore 28. The forward ends of the work pistons 20 and 22 are correspondingly conical so as to seat on the valve seats when in on position as shown in FIG. 2. However, it is emphasized that the two working pistons can be of different shape, for example cylindrical and that in place of the conical valve seats suitable ports can be provided in the housing which are opened and closed by corresponding control edges of the working pistons. As seen in FIG. 2a the valve in accordance with the invention provides a straight line passage between the return connection 16 and the load circuit connection 18 whereby fast filling and emptying of the load circuit can be attained because the stream of fluid pressure medium does not change direction and hence resistance to flow is kept very small. However, the invention is not limited to such a valve with straight line flow.

Each of the working pistons is provided near its rear end with a sealing ring or packing 30 which engages and forms a seal with the wall of the respective cylinder. A sealing ring or packing 32 on a forward end portion of the piston of reduced diameter is engageable with a restricted portion 144 of the cylinder. Between the two sealing rings the periphery of the piston is recessed to provide an annular chamber between the piston and the cylinder wall.

The working piston 20 is provided with a central longitudinal through bore 34 and the working piston 22 is provided with a central longitudinal through bore 36. Control pins 42 and 44 are arranged respectively in the longitudinal bores 34 and 36 of the working pistons. The two control pins are in axial alignment with one another and are axially slidable in their respective pistons. Each has a rear shaft portion 46, 48, a forward shaft portion 54, 56 (FIG. 2) and a collar 50, 52 between the forward and rearward shaft portions. The longitudinal bores in which the control pins are guided are enlarge for part of their lengths to form chambers 74, 76 in which the collars 50, 52 are slidable. Compression springs 78, 80 are arranged in the chambers 74, 76 and act between the rear ends of the chambers and the respective collars 50, 52 so as to bias the control pins toward one another whereby the collars 50, 52 are pressed against corresponding shoulders 158, 160 of the respective work pistons. The length of the rear shaft portions 46, 48 of the two control pins is selected so that the ends 58, 60 of the control pins project beyond the rear faces 62, 64 of the respective work pistons in the working position (FIG. 2) while in the off position (FIG. 1) in which the collars 50, 52 engage the shoulders 158, 160 the ends 58 and 60 are flush with the rear end faces 62, 64 of the working pistons. At their forward ends the control pins 42, 44 have conical shoulders 66, 68 from which cylindrical projections 70, 72 extend.

The movement of the working pistons 20, 22 is controlled by pilot valves 82, 84 which are suitably actuated for example by electromagnets 86, 88. The pilot valves comprise pistons movable axially in cylindrical chambers formed in the valve housing. At one end of each of the chambers there is a valve seat 94, 96 surrounding a passageway open to atmospheric pressure. At the other end there is a valve seat 90, 92 connected by channels 102, 104 with the inlet 14 and thereby connected with a supply of pressure fluid (not shown) and by a channel 114, 116 with the space 118, 120 at the rear end of the respective cylinder 24, 26. The pistons of the pilot valves are biased by compression springs 98, 100 against the valve seats 90, 92 and are movable axially in the opposite direction by the electromagnets 86, 88 when energized.

Channels 106 and 108 branching off of the channels 102, 104 lead to annular spaces 110, 112 formed between the working pistons and the respective cylindrical chambers of the housing. In the on position of the valves (FIGS. 2 and 2a), the annular spaces 110 and 112 are connected respectively with annular passageways 146 and 162 which are connected by supply channels 148, 164 with a supply chamber 150 in which the supply circuit connection 18 opens.

Midway between the cylinders 24, 26 the housing 12 is provided with a bore perpendicular to the axis of the control pins 42, 44 to receive a longitudinally movable tripping pin 122. A compression spring 124 acts against a collar 136 to bias the tripping pin 122 inwardly, inward movement of the tripping pin being limited by the collar 136. The tripping pin carries a cross arm 126 on which there are two spaced projections 128, 130 which actuate respectively two separate electrical switches 132 and 134.

The valve assembly in accordance with the present invention operates as follows. In the position shown in FIG. 1, both of the pilot valves 82 and 84 are closed so that the flow of pressure fluid to the chambers 118 and 120 of the cylinders 24, 26 is interrupted. As pressure fluid is continuously supplied to the annular spaces 110, 112 through the branch channels 106, 108, the working pistons 20, 22 are retained in their rearmost positions as shown by reason of the pressure differential arising from the fact that the rear portions of the pistons carrying the sealing rings 30 are of larger diameter than the forward portions carrying the sealing rings 32. The control pins 42, 44 are held in their forward positions as shown by the springs 78, 80. The tripping pin 122 remains in the normal position shown in FIG. 1 and the electrical switches 132 and 134 are not actuated, As the work pistons 20, 22 are in their rearmost positions, the load circuit connection 18 is connected with the return line 16 through the return channels 38, 40 (FIG. 1).

If the pilot valves 82, 84 are now operated by the electromagnets 86, 88 to move the valve pistons upwardly as shown in FIG. 2, the valve seats 94 and 96 are closed and the valve seats 90 and 92 are opened so that pressure fluid flows through the channels 114 and 116 to the chambers 118 and 120 at the rear ends of the cylinders 24 and 26. The working pistons 20 and 22 are thereby moved toward one another and are pressed against the respective valve seats 154 and 156. The return flow channels 38 and 40 are thereby closed and the pressure fluid now flows from the inlet 14 through the channels 102 and 104, channels 106 and 108, annular spaces 110 and 112 and annular channels 146 and 142 and through the supply channels 148 and 164 into the supply chamber 150 and from here to the load circuit connection 18.

Figure 1:
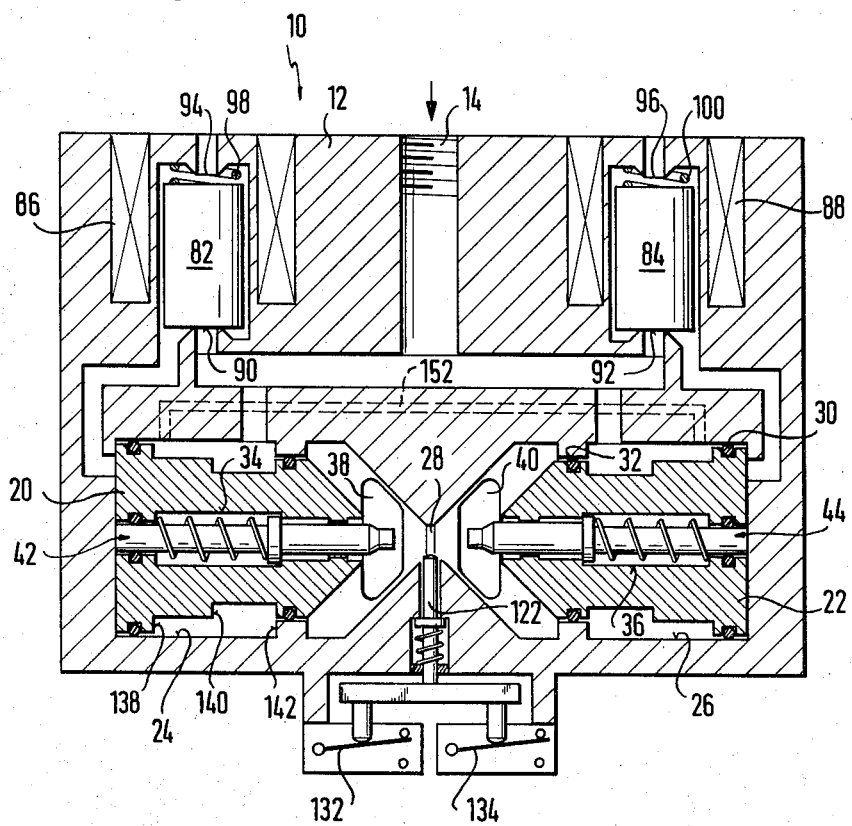
FIG. 1 is a longitudinal section of a valve assembly in accordance with the present invention shown in off position.

If the electromagnets 86, 88 are now deenergized the valve pistons of the pilot valves 82, 84 are returned to the position shown in FIG. 1 by the springs 98, 100. The valve seats 90 and 92 are thereby closed and the valve seats 94 and 96 are opened so that the chamber 118 and 120 at the rear ends of cylinders 24 and 26 are emptied through the channels 114 and 116 and the valve seats 94 and 96. The working pistons are thereby returned to their FIG. 1 position by the pressure acting on the annular shoulders 138 and 140. The pressure fluid is admitted not only to the annular shoulders 138 and 140 but also to the annular shoulders 142. However, as the combined surface area of the annular shoulders 138 and 140 is greater than the surface area of the annular shoulder 142, the resulting pressure differential returns the working pistons to their normal position as shown in FIG. 1.

When the working pistons are moved from the position shown in FIG. 1 to that shown in FIG. 2, the control pins 42 and 44 move with their respective pistons until their cylindrical projections 70 and 72 meet in the middle of the valve, i.e. in the plane of symmetry normal to the axis of the working pistons. The length of the forward shaft portions 54 and 56 together with the conical shoulders 66, 68 and the cylindrical projections 70, 72 of the control pins is so selected that the two control pins meet one another before the two working pistons have reached the closed position shown in FIG. 2. Thus, after the two control pins meet one another in the middle, the working pistons continue to move toward one another until they finally reach the working position shown in FIG. 2 and 2a. As the control pins cannot move farther toward one another their collars 50, 52 are displaced from the shoulders 158, 160 of the working pistons against the force of the compression springs 78, 80 so that the rear ends 58 and 60 of the two control pins project beyond the rear faces 62 and 64 of the working pistons as shown in FIGS. 2 and 2a. In the correct working position shown in FIGS. 2 and 2a, the tripping pin 122 is not actuated since the cylindrical projections 70 and 72 of the control pins do not disturb the tripping pin.

Figure 3:
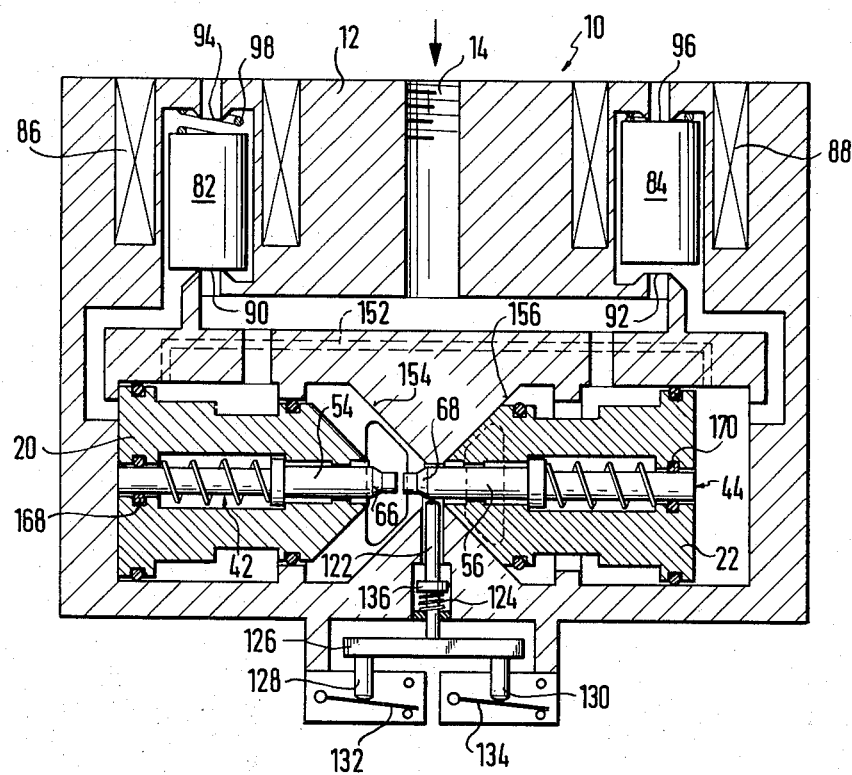
FIG. 3 is a longitudinal section showing the valve in a position of faulty operation.

FIG. 3 illustrates a faulty operation in which in switching on, the pilot valve 82 has not opened or in switching off, the pilot valve 84 has not closed. The working piston 20 thereby finds itself in normal position and the working piston 22 finds itself in working position, i.e. in closed position. In this position the pressure fluid flows from the inlet 14 as described above to the supply chamber 150 and from here, not only to the load but through the now opened return channel 38 to the return connection 16. As the cross section of the supply channels is substantially smaller than the cross section of the return channels, there remains in all cases a small residual pressure which is far less than the operating pressure of the load. Hence, with the valve in the faulty position shown in FIG. 3, the load will not be operated.

The control pin 42 remains in its normal position with the working piston 20 so that when the control pin 44 has moved with its working piston 22 to the plane of symmetry, it is not engaged by the control pin 42 and it is hence moved farther toward the left by its spring 80 to the position shown in FIG. 3. The conical shoulder 68 of the control pin 44 thereby overrides the inner end of the tripping pin 122 and pushes the pin 122 radially outwardly until the pin 122 rests on the forward shaft portion 56. This movement of the tripping pin 122 is transmitted through the cross bar 126 and the projections 128 and 130 to both of the switches 132 and 134 which are thereby switched from the positions shown in FIGS. 1 and 2 to the position shown in FIG. 3. Through this switching of the switches 132, 134 the entire fluid pressure circuit is switched off and the apparatus is taken out of operation and can be restored only after the disturbance has been removed. Through the use of two switches 132 and 134 a relatively high degree of security is attained since if one of the switches sticks or otherwise does not operate properly, the other switch remains operative to cut off the fluid circuit. The same results are attained when, for example, one of the working pistons sticks in any position or there is other disturbance of the working pistons, the pilot valves, the channels or the valve seats.

With a valve assembly in accordance with the present invention it is further assured that the tripping pin 122 will be actuated and the fluid circuit will thereby be switched off in the event of a distrubance or a breakdown of one of the control pins itself or its compression spring. If it is assumed that the control pin 44 sticks in the position shown in FIG. 1 with respect to the piston 22, it will push the control pin 42 back against the force of its spring 78 when the pistons are moved to their inner position as shown in FIG. 2. The tripping pin 122 will thereupon be displaced by the conical shoulder 68 of the control pin 44 so as to actuate the switches 132 and 134. The same thing happens when the control pin 44 operates normally but the pressure spring 78 of the control pin 42 breaks. In this case, the normally operating control pin 44 pushes the control pin 42 back since the latter is not loaded by its spring 78.

If one of the control pins, for example the control pin 42, is blocked in the position shown in FIG. 2 in which its collar 50 is spaced from the shoulder 158, the rear end 58 of the control pin will be engaged by the end wall 166 (FIG. 2a) of the housing when the work piston 20 is moved back to the position shown in FIG. 1 and will thereby be pushed forwardly until the collar 50 again engages the sholder 158. In this connection, the surface areas of the annular shoulders 138 and 140 are selected sufficiently large to provide a sufficiently large force to push the control pin 42 from the position shown in FIG. 2 to that shown in FIG. 1. If the sticking of the control pin 42 is not thereby removed so that it sticks again but in the position shown in FIG. 1, the result is that when it meets the other control pin 44 which is normal, it pushes the latter back against the force of its spring 80 when the pistons are moved to the position shown in FIG. 2 so that as explained above, the tripping pin 122 is displaced by the conical shoulder 66 of the control pin 42 and thereby the electrical switches 132 and 134 are actuated. As shown in FIG. 3, the control pins are sealed with respect to their respective pistons by the sealing rings 168 and 170 so that the pressure fluid from the chamber 118 or 120 cannot flow to the chambers 74 and 76.

The control pins are forcibly actuated on each operation of the valve with the result that upon any disturbance for example, by increased friction through foreign bodies, sticking, failure of the springs or failure of the sealing of the control bolts, the tripping pin 122 is actuated in each instance by the control pin which remains normal or by the malfunctioning control pin.

As a result of manufacturing tolerances, friction of the sealing rings and the like, the possibility exists that the two valves do not work perfectly in synchronism with one another. To correct for this, the housing is provided with a connecting channel 152 which connects the chambers 118 and 120 with one another and is provided with a suitable aperture. In this way there is an equalization of pressure between the chambers 118 and 120 whereby any leakage is largely compensated and operation of the protective device and the electrical switch in the absence of a disturbance is avoided. The cross section of the aperture in the channel 152 is selected to provide suitable flow between the chambers 118 and 120 and is less than the cross section of the pilot valve channels.

The present invention provides a substantial increase in the reliability of operation of the apparatus, in particular presses, by protection not only against disturbances of the working valves or the pilot valves, but also from disturbances of the safety device itself. While a preferred embodiment of the invention has been shown in the drawings and is herein particularly described, it will be understood that many modifications can be made and that the invention is accordingly in no way limited to the illustrated embodiment.

What we claim and desire to secure by letters patent is:

1. In a valve assembly for controlling fluid pressure operated apparatus, in particular presses, having a housing, two parallel connected valves comprising two axially aligned valve chambers in said housing, axially aligned valve members in said chambers, and fluid passages in said housing controlled by axial movement of said valve members, and pilot valves controlling the axial movement of said valve members; the improvement comprising an axial bore in each of said valve members, an axially movable control pin in each of said bores for relative movement therewith and electric switch means operable by said control pins upon malfunctioning of said valves.

2. A valve assembly according to claim 1, in which said control pins are axially aligned with one another and project beyond the forward ends of said valve members when in rest position so that upon movement of said valve members toward one another said control pins engage one another.

3. A valve assembly according to claim 2, comprising spring means acting between each of said control pins and the respective valve member to bias said control pins toward one another.

4. A valve assembly according to claim 3, in which said bores extend to the rear ends of said valve members and in which said control pins project beyond the rear ends of said valve members into said valve chambers when said valve members are moved toward one another.

5. A valve assembly according to claim 4, comprising sealing means between said control pins and said bores of sealing said bores from said valve chambers.

6. A valve assembly according to claim 1, in which each of said control pins has a tapered shoulder, and in which said switch means comprises a stem portion approximately perpendicular to said control pins and engageable by said tapered shoulders to actuate said switch means.

7. A valve assembly according to claim 6, in which said switch means comprises two switches both operable by said stem portion upon movement of said stem portion by said control pins.

8. A valve assembly according to claim 1, comprising a selectively restricted passageway connecting said valve chambers to equalize the pressure therein.

9. A valve assembly according to claim 1, in which each of said valve chambers is generally cylindrical with a cylindrical wall and a cylindrical restriction, and in which each of said valve members is a piston with axially spaced peripheral sealing means engageable respectively with said cylindrical wall and said cylindrical restriction and with an annular space defined between said sealing means.

10. A valve assembly according to claim 9, in which said housing has passages leading from said pilot valves to said annular spaces and to end portions of said valve chambers, whereby said pistons are movable axially by pressure fluid supplied respectively through said passageways under control of said pilot valves.

* * * * *